United States Patent [19]
Klatt et al.

[11] Patent Number: 4,593,606
[45] Date of Patent: Jun. 10, 1986

[54] GEAR POSITIONING CYLINDER

[75] Inventors: Alfred Klatt, Wathlingen; Karlheinz Brinkmann, Hanover, both of Fed. Rep. of Germany

[73] Assignee: WABCO Fahrzeugbremsen GmbH, Hanover, Fed. Rep. of Germany

[21] Appl. No.: 681,340

[22] Filed: Dec. 13, 1984

Related U.S. Application Data

[63] Continuation of Ser. No. 376,469, May 10, 1982, abandoned.

[30] Foreign Application Priority Data

May 11, 1981 [DE] Fed. Rep. of Germany ....... 3118583

[51] Int. Cl.$^4$ .............................................. F01B 7/20
[52] U.S. Cl. .......................................... 92/52; 92/65; 92/85 R
[58] Field of Search ..................... 92/13.1, 65, 52, 108, 92/62, 85 R

[56] References Cited

U.S. PATENT DOCUMENTS

| 2,831,464 | 4/1958 | Lillquist | 92/13.1 |
| 3,866,727 | 2/1975 | Myers | 92/13.1 |
| 4,296,679 | 10/1981 | Mattsson | 92/65 |
| 4,388,986 | 7/1983 | Umezawa | 92/65 |

FOREIGN PATENT DOCUMENTS 888036  1/1962  United Kingdom ................... 92/65

Primary Examiner—Abraham Hershkovitz
Attorney, Agent, or Firm—G. J. Falce

[57] ABSTRACT

A gear positioning cylinder having forward, reverse, and neutral gear selection provided by a positioning rod attached to a main piston in which an auxiliary piston is telescopically arranged for compactness.

4 Claims, 1 Drawing Figure

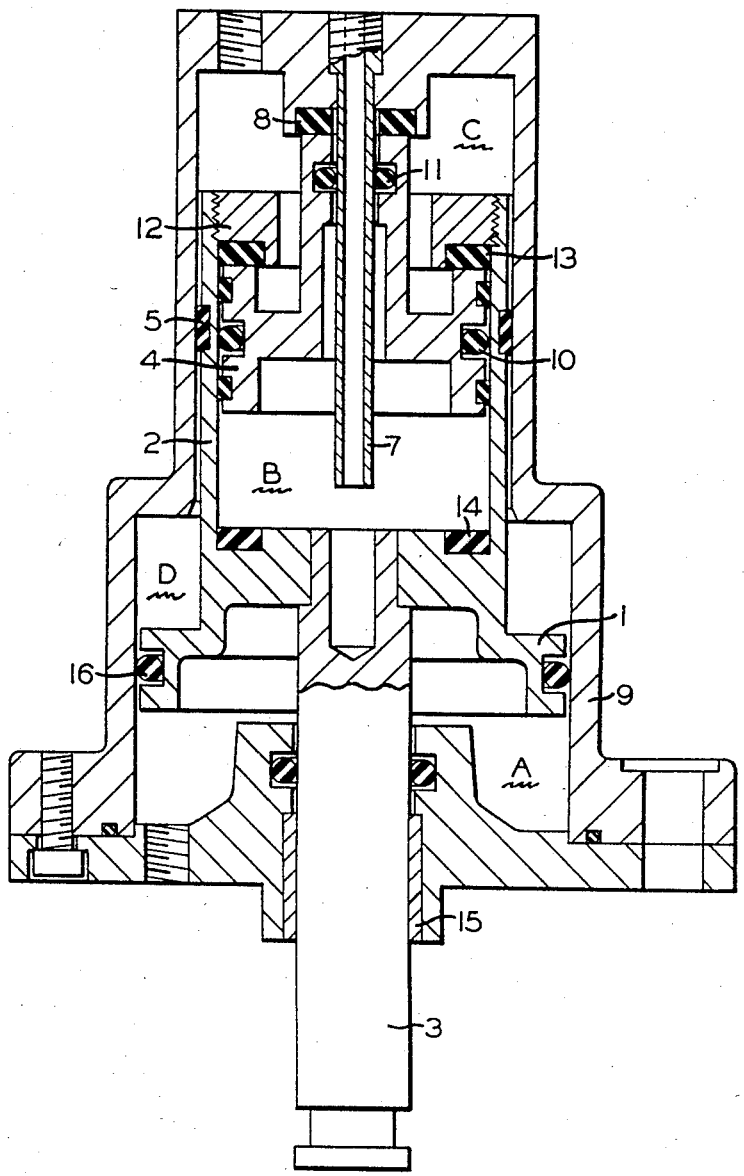

GEAR POSITIONING CYLINDER

This is a continuation of application Ser. No. 376,469, filed May 10, 1982, now abandoned.

BACKGROUND OF THE INVENTION

The present invention relates to positioning cylinders and particularly to a positoning cylinder for use with a power operated gear shift mechanism.

Gear positioning cylinders of this type are used in larger commercial vehicles which are equipped with an auxiliary actuated gear shift for engaging the transmission gears, when the configuration of the gear shift pattern is in the shape of an H. These positioning cylinders must establish three positions corresponding to the forward, neutral, and reverse positions of the gear shift lever.

Normally, these gear positioning cyliders are located in a confined area in or on the gear housing and must therefore be built as small as possible, yet with sufficient force to effect gear engagement. Furthermore, it is desirable to keep the three positions, particularly the neutral position within exact tolerances, and to engage the different gears with varying forces.

SUMMARY OF THE INVENTION

The object of the present invention, therefore, is to provide a gear positioning cylinder having forward, neutral, and reverse positions that are precisely defined, which is relatively small in size, and economical to build.

BRIEF DESCRIPTION OF THE DRAWINGS

The foregoing object and attendant advantages of the invention will become apparent from the following more detailed explanation when taken with the acompanying single FIGURE drawing showing a cross-sectional view of the gear positioning cylinder.

DESCRIPTION OPERATION

A housing 9 of the gear positioning cylinder contains a main piston 1 having a gear positioning rod 3 attached to one side and projecting through one end cover of the housing for engaging the gears of a transmission (not shown). A sealing ring 16 of main piston 1 prevents leakage of pressure between chambers A and D formed on the opposite sides of piston 1. A housing 2 formed as a hollow, annular, side wall extends from the side of piston 1 opposite positioning rod 3 to form an auxiliary cylinder in which and auxiliary piston 4 is contained. A closure member 12 is fixed, as by screw threads, to the end of housing 2 to limit movement of auxiliary piston 4 in an upward direction relative to piston 1. A shock absorbing ring 13 is contained in closure member 12 to cushion auxiliary piston 4 at its one extreme end position, while a shock absorbing ring 14 is contained in piston 1 to cushion auxiliary piston 4 in its other extremend position. A chamber B is formed between the adjacent faces of main piston 1 and auxiliary piston 4, and is penetrated by a tube 7 that passes axially through the other end of housing 9 and a central opening in auxiliary piston 4, which is sealed by a ring 11. A shock absorbing ring 8 in the end of housing 9 cushions auxiliary piston 4 from impact with its stop against the end of housing 9. Formed between the end of housing 9 and auxiliary piston 4 is a chamber C. A seal ring 10 prevents leakage of pressurized air between chambers B and C. A slide bushing 5 between the annular side wall formed by housing 2 of main piston 1 and the surrounding housing of the positioning cylinder and another slide bushing 15 in the end cover through which positioning rod 3 passes assure smooth axial movement of the main piston between its two extreme end positions, the main piston being shown presently in a neutral or middle position between the two end positions.

In order to establish a middle position of piston 1 corresponding to a neutral position of gear positioning rod 3, chamber B is supplied with air at a predetermined maximum pressure viatube 7, while concurrently chamber A is supplied with fluid pressure at a reduced value via the port in the one end cover of the gear positioning cylinder housing. The pressure in chamber C is vented so that the pressure in chamber B is effective to force auxiliary piston 4 against stop ring 8. At the same time, the pressure in chamber B forces main piston 1 in the opposite direction until closure member 12 having ring 13 engages auxiliary piston 4. As shown, this locates main piston 1 intermediate its end stops to define the middle position of main piston 1 and thus the neutral position of gear positioning rod 3. It is to be understood that the respective pressure areas on the opposing faces of main piston 1 and the effective air pressure supplied to chambers A and B are such that the force exerted on piston 1 by the pressure in chamber B is greater than the opposing force exerted on piston 1 by the reduced pressure in chamber A, but not sufficiently great to force auxiliary piston 4 away from stop ring 8.

In order to shift piston 1 to its upward-most position, chamber A is supplied with air at full pressure, while chambers B and C are depressurized. This causes piston 1 to move toward auxiliary piston 4 until engagement occurs between the stop ring 14 of piston 1 and the adjacent end of auxiliary piston 4. In this position, the end of auxiliary piston 4 that engages stop ring 14 defines the position of piston 1, whereas in the middle position, the other end of auxiliary piston 4 that supports stop ring 13 defines the position of piston 1.

In order to shift piston 1 to its lowermost position, chamber A is depressurized, while chambers C and D are supplied with air at full pressure. In addition, chamber B is supplied with air at a pressure that varies dependent upon the gear selected, it being understood that different gears require different forces to effect smooth and prompt engagement. Under conditions of equal air pressure in chamber B and C, no differential force will exist across auxiliary piston 4 and accordingly the pressure in chamber B will act on piston 1 in a downward direction to produce gear engagement with maximum force. If the pressure in chamber B is reduced, a downward acting differential will occur across auxiliary piston 4 to force piston 4 downwardly into engagement with piston 1. This increased downward force on piston 1, however, is more than balanced by the reduction of pressure in chamber B acting on piston 1, due to the differential pressure areas between pistons 1 and 4 subject to the pressure in chamber B. The net result of this pressure reduction in chamber B, therefore, is a decrease in the net downward acting force on piston 1. Accordingly, the force of gear engagement effected by positioning rod 3 is varied by varying the pressure in chamber B.

Since slide bushing 5 permits air flow between chambers C and D, it will be appreciated that no vent drill port need be providedin chamber D. The advantage of this is that dirt and moisture is prevented from entering from the outside.

Having now described the invention, what we claim as new and desire to secure by Letters Patent, is:

1. A gear positioning cylinder comprising:
   (a) a housing;
   (b) an operating cylinder formed within said housing;
   (c) a main piston operably disposed in said operating cylinder and cooperating therewith to form first and second pressure chambers on opposite sides thereof subject to the supply and release of fluid under pressure;
   (d) a positioning rod fixed to one side of said main piston and projecting through said first chamber and through said housing to establish first and second positions and a third position intermediate said first and second positions;
   (e) an auxiliary cylinder formed by an annular wall projecting from the other side of said main piston into the said second chamber, said auxilisay cylinder being open at the projecting end thereof and closed at the opposite end by said main piston within the areas of said annular wall, said closed end of said auxiliary cylinder providing a first stop;
   (f) a closure member at said projecting end providing a second stop;
   (g) an auxiliary piston operably disposed in said auxiliary cylinder for movement between said first and second stops, said auxiliary piston having a central portion projecting from one side thereof through an opening in said closure member when said auxiliary piston is in engagement with said second stop; and
   (h) said housing providing a third stop with which said projecting central portion of said auxiliary piston is engageable, said positioning rod being in said first position when said auxiliary piston is in engagement with said first and third stops, in said second position when said auxiliary piston is disengaged from said third stop and engaged with said second stop, and in said middle position when said auxiliary piston is engaged with said second and third stops.

2. A gear positioning cylinder as recited in claim 1, wherein a side opposite piston cooperates with said operating cylinder to form first and second pressure chambers on said one and said other sides thereof, said one side of said auxiliary piston cooperates with said auxiliary cylinder at said closed end thereof to form a third fluid pressure chamber, said positioning rod being located in said first position in response to the suply of fluid to said first chamber at a certain chosen value and the release of fluid pressure from said second and third chambers.

3. A gear positioning cylinder as recited in claim 2, further comprising:
   (a) said auxiliary piston having equal effective pressure areas on said one and said opposite sides;
   (b) a fluid pressure supply tube in said housing at said third stop, said tube extending through an opening in said auxiliary piston and terminating in said third chamber such that a differential pressure area is established between said auxiliary and main pistons subject to the fluid pressure of said third chamber; and
   (c) said positioning rod being movable to said second position in response to the supply of fluid to said second chamber at said certain chosen value, the release of fluid pressure from said first pressure chamber, and the supply of fluid to said third chamber at a variable pressure.

4. A gear positioning cylinder as recited in claim 2, wherein said positioning rod is located in said middle position in response to the supply of fluid to said third chamber at said certain chosen pressure and the reduction of fluid in said first chamber to a value less than said certain chosen pressure.

* * * * *

UNITED STATES PATENT AND TRADEMARK OFFICE
CERTIFICATE OF CORRECTION

PATENT NO. : 4,593,606
DATED : June 10, 1986
INVENTOR(S) : Alfred Klatt & Karlheinz Brinkmann It is certified that error appears in the above-identified patent and that said Letters Patent are hereby corrected as shown below:

Column 3, claim 1, clause (c), line 10, delete "the"

line 11, delete "reof" and insert --thereof--

Column 4, claim 2, lines 6-8, delete "piston cooperates with said operating cylinder to form first and second pressure chambers on said one and said other sides thereof,"

Signed and Sealed this

Thirtieth Day of December, 1986

Attest:

DONALD J. QUIGG

Attesting Officer

Commissioner of Patents and Trademarks